United States Patent [19] [11] 4,339,423
Christe et al. [45] Jul. 13, 1982

[54] PEROXONIUM SALTS

[75] Inventors: Karl O. Christe, Calabasas; William W. Wilson, Canoga Park, both of Calif.

[73] Assignee: The United States of America as represented by the Secretary of the Navy, Washington, D.C.

[21] Appl. No.: 115,306

[22] Filed: Jan. 25, 1980

[51] Int. Cl.$^3$ .............................................. C01B 15/00
[52] U.S. Cl. ................................................. 423/462
[58] Field of Search .......................................... 423/462

[56] References Cited

PUBLICATIONS

Christe et al., "Novel Onium Salts Synthesis and Characterization of the Peroxonium Cation, H$_2$OOH+", *Inorganic Chemistry*, 18 (1979), pp. 2578–2586.
Christe et al., in *Inorganic Chemistry*, vol. 14 (1975), pp. 2224–2233, 2821–2824.
Alder et al., "An Exceptionally Powerful Oxidant: the Ion H$_3$O$_2$+", *J. Chem. Soc.*, (1964), pp. 4707–4712.
Olah et al., "Chemistry in Superacids", *J. Am. Chem. Soc.*, vol. 95, May, 1973,pp. 3582–3584.

*Primary Examiner*—Brian E. Hearn
*Attorney, Agent, or Firm*—Robert F. Beers; W. Thom Skeer; Lloyd E. K. Pohl

[57] ABSTRACT

The peroxonium salts, $H_3O_2^+Sb_2F_{11}^-$, $H_3O_2^+SbF_6^-$ and $H_3O_2^+AsF_6^-$, are prepared by protonation of H$_2$O$_2$ in anhydrous HF solutions of the corresponding Lewis acids. The salts decompose producing the corresponding H$_3$O+ salts and O$_2$ in the temperature range of from 20° to 50° C. and thus are useful as oxidizers in situations where the production of oxygen in the 20°–50° C. temperature range is desirable. The salts also provide a convenient means for storing H$_2$O$_2$ in a solid form.

3 Claims, No Drawings

PEROXONIUM SALTS

BACKGROUND OF THE INVENTION

1. Field of the Invention

This invention relates to peroxonium salts and to method for their preparation.

2. Description of the Prior Art

Materials which will produce $O_2$ at relatively low temperatures are in demand. For example, such a material could be used to produce oxygen for use in manned space vehicles and the like simply by placing a quantity of the material in a heatable container and heating the material when oxygen production was desired.

$H_2O_2$ is a very useful producer of molecular oxygen. For example, it is used to generate excited oxygen for use in chemical lasers. Also, it is used as a monopropellant in liquid rocket engines. However, it has a drawback in that it is difficult to handle. It readily undergoes autocatalytic decomposition. Accordingly, it would be convenient if this material could be stored in a stable salt form.

SUMMARY OF THE INVENTION

According to this invention, the first known peroxonium salts are prepared. The salts are $H_3O_2^+SbF_{11}^-$, $H_3O_2^+SbF_6^-$ and $H_3O_2^+AsF_6^-$. The salts are prepared by protonation of $H_2O_2$ in anhydrous HF solutions of the corresponding Lewis acids. The salts may be used to produce oxygen by heating them to a temperature in the range of from 20° to 50° C. whereupon they decompose producing the corresponding $H_3O^+$ salts and $O_2$. The salts also provide a convenient means for storing $H_2O_2$ in a solid form.

DESCRIPTION OF THE PREFERRED EMBODIMENTS

The following specific examples describe the preparation of the three peroxonium salts of this invention.

EXAMPLE I

PREPARATION OF $H_3O_2^+AsF_6^-$

The Lewis acid, $AsF_5$ (15.39 mmol) and anhydrous HF (50.76 mmol) were combined at $-196°$ C. in a passivated Teflon-FEP ampule equipped with a valve. The mixture was allowed to melt and homogenize. The ampule was then taken to a drybox and $H_2O_2$ of 99.95% purity (15.29 mmol) was syringed in at $-196°$ C. The ampule was then transferred back to the vacuum line and evacuated at $-196°$ C. It was then kept at $-78°$ C. for 2 days to allow reaction. After this period, no evidence was found for material noncondensible at $-196°$ C., i.e., there was no evidence of $O_2$ evolution. The mixture was then (after 2 days) warmed to $-45°$ C. and a clear solution resulted. Material volatile at $-45°$ C. was removed by pumping for 10 hours and was collected at $-196°$ C. A white solid residue resulted which was marginal stability at ambient temperature. On the basis of the observed material balance (weight of 15.29 mmol $H_3O_2^+AsF_6^-$ calculated: 3.423 g; found: 3.47 g) the conversion of $H_2O_2$ to $H_3O_2^+AsF_6^-$ was complete within experimental error. The compound was shown by infrared and Raman spectroscopy to contain the $H_3O_2^+$ cation and the $AsF_6^-$ anion.

EXAMPLE II

PREPARATION OF $H_3O_2^+SbF_6^-$

Antimony pentafluoride (27.96 mmol) was added in a drybox to a passivated Teflon FEP U-tube equipped with two valves and a Teflon-coated magnetic stirring bar. Anhydrous HF (522.9 mmol) was added on the vacuum line at $-196°$ C., and the mixture was homogenized by stirring at 20° C. In the drybox, hydrogen peroxide (27.97 mmol) was syringed into the U-tube at $-196°$ C. The cold tube was transferred back to the vacuum line and was evacuated. The tube was warmed from $-196°$ C. to $-78°$ C. for 1 hour with agitation which resulted in the formation of a finely divided white solid, suspended in the liquid HF. When the mixture was warmed to 20° C., the white solid completely dissolved. No gas evolution was observed during the entire warm-up operation, and no noncondensable material could be detected when the mixture was cooled again to $-196°$ C. The HF solvent was pumped off at $-22°$ C. for 3 hours resulting in 7.566 g of a white solid (weight calculated for 27.96 mmol of $H_3O_2^+SbF_6^-=7.570$ g), stable at 20° C. The compound was shown by vibrational spectroscopy to be composed of $H_3O_2^+$ cations and $SbF_6^-$ anions. Additional support for the composition of the product was obtained by allowing a sample of $H_3O_2^+SbF_6^-$ to thermally decompose at about 45° C. This decomposition produced $O_2$ and the known $H_3OSbF_6^-$ salt in almost quantitative yield.

EXAMPLE III

PREPARATION OF $H_3O_2^+Sb_2F_{11}^-$

The synthesis of this compound was carried out in a manner identical with that described above for the preparation of $H_3O_2^+SbF_6^-$, except for using an excess of $SbF_5$. Thus, the combination of $SbF_5$ (14.83 mmol), HF (407 mmol), and $H_2O_2$ (6.83 mmol) produced 3.581 g of a white solid (weight calculated for 6.83 mmol of $H_3O_2^+SbF_6^-\cdot 1.17SbF_5=3.581$ g), stable up to about 50° C. The compound was shown by vibrational and NMR spectroscopy to contain the $H_3O_2^+$ cation and $Sb_2F_{11}^-$ as the principal anion.

All of the above peroxonium salts decompose to form $O_2$ and the corresponding $H_3O^+$ salts at temperatures in the range of from 20° to 50° C. Thus, to use the salts of this invention to produce $O_2$ one may heat them to a temperature with the stated range.

As has been indicated above, the salts of this invention also provide a means for storing $H_2O_2$ in a solid form.

What is claimed is:

1. A peroxonium salt having the formula $H_3O_2^+X^-$ wherein $X-$ is selected from the group of anions having the formulas $SbF_6^-$ and $AsF_6^-$.

2. A method for preparing a solid salt having the formula $H_3O_2^+X^-$ wherein $X^-$ is selected from the group consisting of $SbF_6^-$, said method comprising the steps of:
   A. dissolving a Lewis acid selected from the group consisting of $AsF_5$ and $SbF_5$ in anhydrous HF to form a solution;
   B. adding $H_2O_2$ in an amount equimolar to that of said Lewis acid to the solution to form a reaction mixture; and
   C. allowing the mixture to react to form a solid salt.

3. A method for preparing a salt containing $H_3O_2^+$ cations and $Sb_2F_{11}^-$ anions, said method comprising the steps of:
   A. dissolving $SbF_5$ in anhydrous HF to form a solution:
   B. adding $H_2O_2$ to said solution to form a reaction mixture, said $H_2O_2$ being added in an amount calculated to provide an excess of $SbF_5$ in said reaction mixture; and
   C. allowing the mixture to react.

* * * * *